(12) United States Patent
Ortscheid et al.

(10) Patent No.: US 6,647,248 B1
(45) Date of Patent: Nov. 11, 2003

(54) CRADLE

(75) Inventors: Annett Ortscheid, Bochum (DE); Thomas Fuhrmann, Buldern (DE)

(73) Assignee: Nokia Mobile Phones, Ltd., Espoo (FI)

( * ) Notice: Subject to any disclaimer, the term of this patent is extended or adjusted under 35 U.S.C. 154(b) by 631 days.

(21) Appl. No.: 09/621,086

(22) Filed: Jul. 21, 2000

(30) Foreign Application Priority Data

Jul. 21, 1999 (DE) .......................................... 199 34 099

(51) Int. Cl.[7] ................................................ H04B 1/38
(52) U.S. Cl. ........................ 455/90; 455/550; 455/575; 379/446; 379/455; 379/454; 379/426; 379/424; 224/255; 224/269; 224/929; 224/930; 248/176; 248/309.1; 248/371
(58) Field of Search .................... 455/550, 90, 575; 379/446, 455, 454, 426, 424; 224/255, 269, 929, 930; 248/176.1, 309.1, 371

(56) References Cited

U.S. PATENT DOCUMENTS

| | | | |
|---|---|---|---|
| 5,276,588 A | * | 1/1994 | Repplinger et al. ......... 361/736 |
| 5,828,750 A | * | 10/1998 | Perala ........................ 379/446 |
| 6,208,734 B1 | * | 3/2001 | Ortscheid et al. ........... 379/446 |
| 6,212,276 B1 | * | 4/2001 | Inoue et al. ................. 379/424 |
| 6,263,080 B1 | * | 7/2001 | Klammer et al. ........... 379/446 |

* cited by examiner

*Primary Examiner*—William Trost
*Assistant Examiner*—Danh C. Le
(74) *Attorney, Agent, or Firm*—Antonelli, Terry, Stout & Kraus, LLP

(57) ABSTRACT

A cradle that secures a removable device, a body, two side surfaces and two face surface are provided on one face surface, and a movable hook is provided on the other face surface. At least one of the surfaces which has a different designation than the surfaces on which the tabs and hook are located, is equipped with a button, one end of which is equipped with a first slide surface. A slider is provided whose one end has at least one second slide surface and whose other end engages the movable hook(s).

5 Claims, 6 Drawing Sheets

CRADLE

FIELD OF THE INVENTION

The invention relates to the design of cradles, especially cradles that secure a removable device.

BACKGROUND OF THE INVENTION

There are many types of cradles known in accordance with the generic term in the current state of the art. Refer to DE-A-4405506, WO-A-9725223 and DE-A-19652826 for examples of such cradles.

Each of these known cradles consists of a body comprising mainly of two side surfaces and a top and a bottom face surface. The DE-A-19652826 as well as the WO-A-9725223 has a movable hook on one of the face surfaces, while there is a tab on the other face surface. If a device is to be placed in and secured in one of the known cradles, the lower end of the device is initially placed between the body and the tab(s). Once this is done, the device and the body form an angle. To secure the device in the cradle the upper end of the device is then pressed towards the body or towards the face surface containing the movable hook(s). This movement will then cause the movable hook(s) to be bent or pushed back, and then snaps/snap back into its/their original position when the device has reached its end position in the cradle, simultaneously securing the device in the cradle. To remove the device from the cradle, there is a button or key on the face surface equipped with the movable hook(s) that bends the movable hook(s) away from the device so that the upper end of the device can then be removed from the face surface equipped with the movable hook(s). If the upper end of the device is removed from the face surface equipped with the movable hook(s), the device can be pulled out from between the body and the pocket created by the tab(s).

As can easily be understood, it is very unfavorable from an ergonomic standpoint to trigger the removal of the device by pressing the button on the top face surface. This is due to the fact that the natural grasping motion of a person always places the object between the thumb and fingers on the hand, whereby the thumb is primarily parallel to the fingers on the hand. If, based on this natural grasping motion, the device is now required to be removed by a user, the user will use either the thumb or the index finger to press the button. If the user uses the thumb, the inevitable result is that the user will not make good contact with the device. If the index finger is used, an unnatural spreading of the index finger away from the other fingers is required. If it is also taken into consideration that a non-negligible amount of force is required to press the button, then the removal of the device is often done in that one hand is wrapped around the device while the other hand is used to press the button or key. The amount of force needed can be reduced by changing the size of the button or key, but this also results in an increase in the overall length of the cradle.

SUMMARY OF THE INVENTION

The invention is the result of the task of specifying a cradle that eliminates the problems present in the current state of the art by designing a cradle that allows for a simple and secure method of removing a device secured in the cradle based on the natural grasping motion of a human hand.

The cradle of the invention provides that least one of the surfaces other than the surfaces on which the tabs and hook are located is equipped with a button that has a first slide surface on one end, and if there is a slider present whose one end is equipped with at least one second slide surface and whose other end activates the movable hook(s), whereby the first and second slide surfaces are in contact with each other, then the removal of the device from the cradle is very easy and safe to perform without requiring unnatural finger movements or the use of a second hand. Due to the fact that the direct connection between the button(s) and the movable hook is eliminated, the overall distance between the top and bottom face surfaces can be reduced.

If the first and second slide surfaces are both designed as flat surfaces, the pressing of the button can be somewhat difficult due to the friction produced by the surfaces sliding over each other. This binding is then eliminated when at least one of the two slide surfaces coming into contact with each other is designed as a curved surface.

If the cradle is equipped with springs that press either the second slide surface against the first slide surface or the first slide surface against the second slide surface, then it is ensured that the button(s) will always be pushed back to their initial position.

If, there is a spring-loaded cap present on the body that presses against a device placed in the cradle, then it is ensured that a device located in the cradle will more or less be placed in the hand of the user when the button is pressed because the spring-loaded cap pushes the device away from the body when the movable hook releases the device. A particular advantage in this context is that the device is independently pushed away from the body, i.e. no force need be applied using the fingers.

If, the device is a mobile telephone, then it can be very easily removed by hand from the cradle and placed back in the cradle regardless of whether the cradle is positioned horizontally or vertically.

BRIEF DESCRIPTION OF THE DRAWINGS

The following figures contain the following diagrams.

DETAILED DESCRIPTION OF THE PREFERRED EMBODIMENTS OF THE INVENTION

Figure 1:
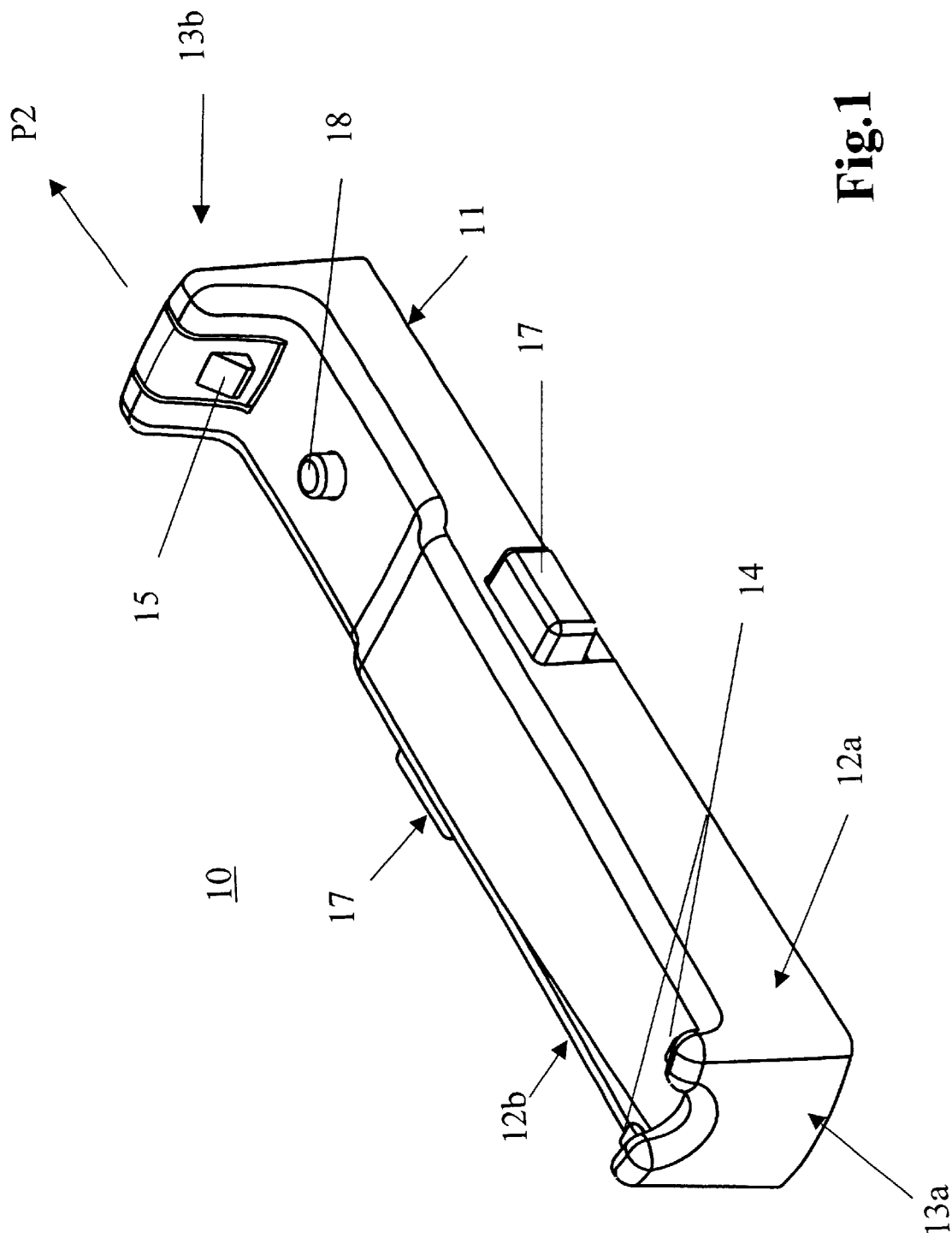
FIG. 1 A perspective drawing of a cradle.

The invention will now be explained in more detail based on the figures. FIG. 1 shows a perspective drawing of a cradle 10. This cradle 10 consists primarily of a body 11 that has two side surfaces 12a, 12b and two face surface 13a, 13a. There are two tabs 14 on the face surface 13a while the other face surface 13b is equipped with a movable hook 15. The body 11 of the cradle 10 is covered by a cover 16. In addition there is a button 17 present on each of the two side surfaces 12a, 12b. These two buttons 17 are connected to the movable hook 15 via a mechanism that will be explained in more detail below and that cannot be seen in FIG. 1 due to the cover 16. There is also a spring-loaded cap 18 that rises up through the cover 16.

Figure 2:
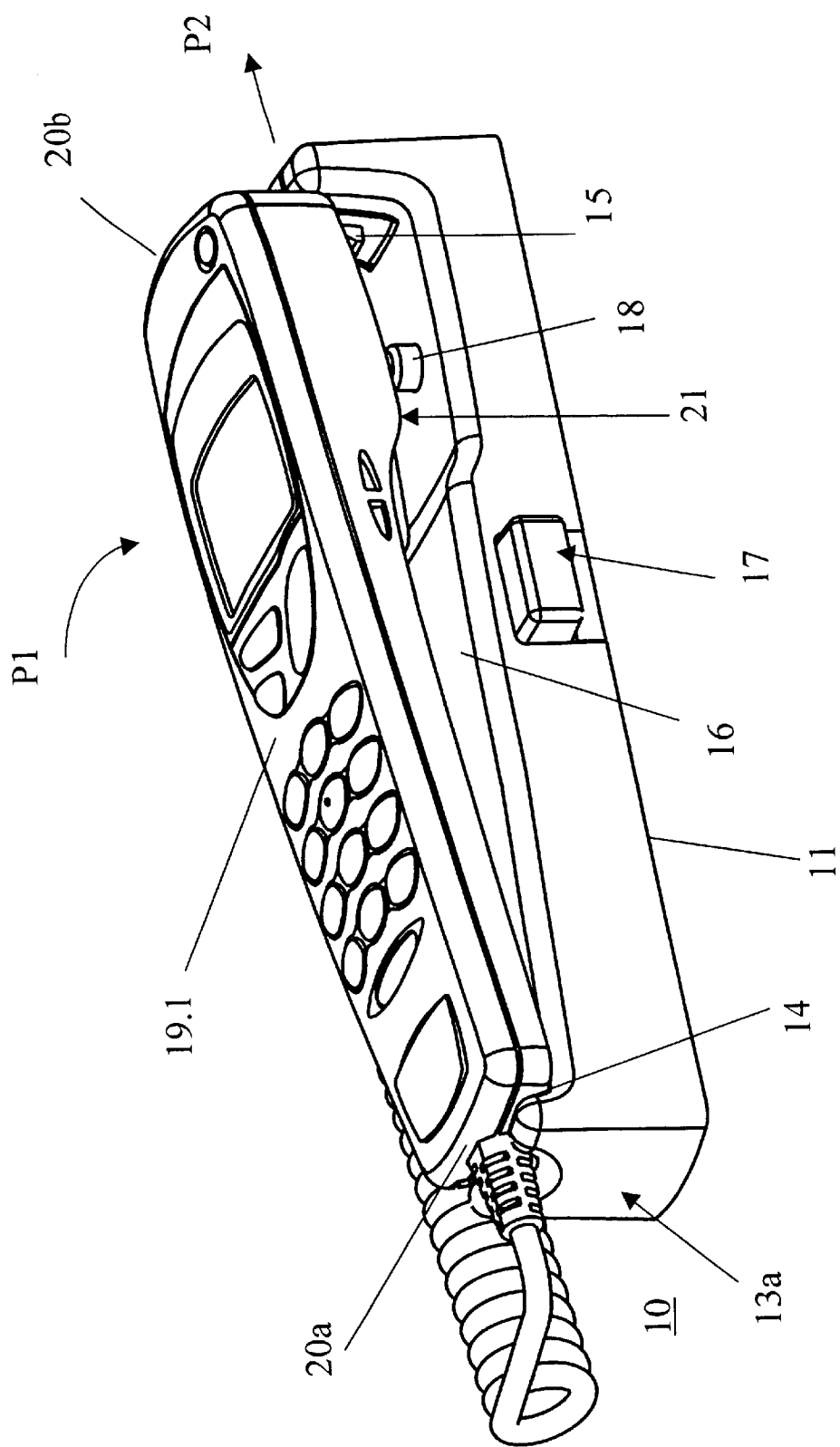
FIG. 2 Another drawing according to FIG. 1.

FIG. 2 shows, in addition to the cradle 10 already described in detail in the context of FIG. 1, a device 19 that is a mobile telephone 19.1 in this case. Even though device 19 is always said to be a mobile telephone 19.1 in the context of the following description, there is no restriction for the use of the cradle 10 as a cradle 10 solely for mobile telephones. On the contrary, it is also possible to use the cradle 10 to periodically secure other devices 19.

As can clearly be seen in the diagram according to FIG. 2, the lower end 20a of the mobile telephone 19.1 is held in the space between the tabs 14 and the cover 16 or the body 11. The upper end 20b of the mobile telephone 19.1 is shown at distance from the cover 16. If, starting in the position shown in FIG. 2, the upper end 20b of the mobile telephone 19.1 is moved in direction of the arrow P1 towards the cover 16, then the movable hook 15 slides out of the way in direction of the arrow P2 due to the contact with the upper end 20b of the mobile telephone 19.1. If the mobile telephone 19.1 has reached its end position in or on the cradle 10, then the movable hook 15 snaps back in the direction opposite of the direction of the arrow P2, thereby protruding into the pocket (not shown) in upper end 20b of the mobile telephone 19.1 to secure the mobile telephone 19.1 in or on the cradle 10. At the same time as the device is moved in direction of the arrow P1 the spring-loaded cap 18 is pushed down by the back side 21 of the mobile telephone 19.1.

The following steps must be carried out to remove the mobile telephone 19.1 from the cradle 10: First, the mobile telephone 19.1 secured in the cradle must be picked up by a human hand so that the thumb comes into contact with one button 17 and at least one other finger of this hand comes into contact with the other button 17. As can easily be understood, this position of the fingers and thumb corresponds to the normal human grasping motion because it does not require the wrist or fingers to be in an unnatural position. If the fingers have assumed the position described above on the mobile telephone 19.1 or the buttons 17 and pressure is applied to the buttons 17 once the fingers are in this position, the movable hook 15 will be moved in direction of the arrow P2 via the mechanism explained in more detail below, whereby the movable hook 15 moves out of the pocket (not shown) on the upper end 20b of the mobile telephone 19.1. Because the spring-loaded cap 18 is constantly pressing against the back side 21 of the mobile telephone 19.1 when the mobile telephone 19.1 is in its end position in or on the cradle 10, the mobile telephone 19.1 will practically be pressed into the user's hand due to the pressure of the spring when the movable hook 15 has released the mobile telephone 19.1. This ensures that the user immediately has firm bodily contact with the mobile telephone 19.1, and damage due to the telephone falling out of the hand, for example, is ruled out.

The mobile telephone 19.1 is then completely removed in that when the spring-loaded cap 18 has pushed the upper end 20b away from the cover 16, the telephone can be pulled up and out (corresponding to the direction of the arrow P2) of the cradle 10.

Even though all diagrams discussed in the description always have two buttons 17, a different example (not shown) of the cradle 10 may be equipped with just one button 17. This reduces the production expense somewhat, but has the disadvantage that a little more pressure must be applied to the button 17 because there is only one button 17. The "one button solution" is also unfavorable because the user does not have to wrap his or her hand completely around the mobile telephone 19.1 when removing the mobile telephone 19.1 with the hand.

In addition we would like to point out that the two buttons 17 do not necessarily have to be located at the same distance from the lower face surface 13a. If the button 17 that is intended to come into contact with the thumb is positioned farther away from the lower face surface 13a as compared to the button 17 that is intended to come into contact with at least one of the fingers of the hand, then the buttons 17 will support the natural grasping motion of the human hand even better in this position because the thumb is generally stretched straight as compared to the fingers and is therefore positioned slightly higher than the tips of the fingers when they are bent. If the two buttons 17 are not to be located at different distances from the lower face surface 13a, but the demands for a natural grasping motion are to be taken into account at the same time, the buttons 17 can also be designed to be large enough so that when the hand grabs the mobile telephone 19.1 in the cradle 10, the slightly higher thumb as well as the finger(s) intended to come into contact with the other button 17 are always both in contact with the corresponding buttons 17.

Figure 3:
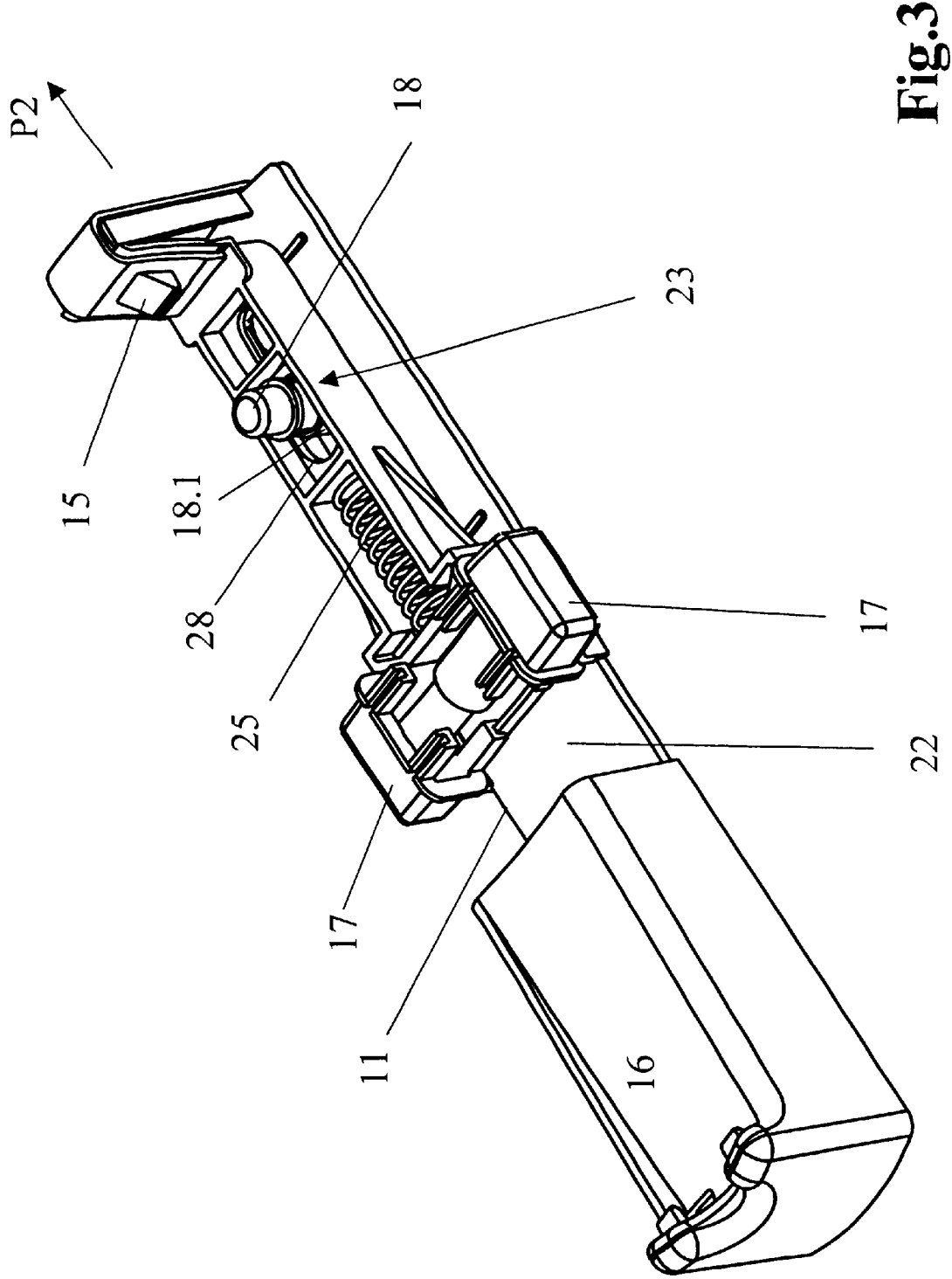
FIG. 3 Another drawing according to FIG. 1.

The perspective according to FIG. 3 is different from the description according to FIG. 1 only in that a section of the cover 16 has been removed. This allows for a view of the mechanism.

It can clearly be seen in FIG. 3 that the mechanism that moves the movable hook 15 in direction of the arrow P2 by pressing the two buttons 17 consists mainly of a slider 23 placed on the base plate 22 of the body 11. This slider 23, shown separately in FIG. 5, contains two chambers 24.1, 24.2. To automatically induce a movement in the direction opposite the direction of the arrow P2 when the buttons 17 are pressed, there is a spring 25 (FIGS. 3 and 4) located in the chamber 24.1 whose lower end 26 is connected to one end 27 of the slider 23 and whose other end presses against the body 11. The other chamber 24.2 (FIG. 5) is equipped with a long slot 28 that is penetrated by a cylinder 18.1 held in place by the spring-loaded cap 18 when the slider 23 is assembled (see FIGS. 3 and 4). This combination of the cylinder 18.1 and the long slot 28 has the task in the example explained here of guiding the slider 23 during its motion in the direction of the arrow P2 as well as in the opposite direction. The flanks 29 of the slider 23 (FIGS. 4 and 5) together with the inside (not shown) of the side surfaces 12a, 12b could alone or together with other components comprise the required guide elements.

Figure 4:
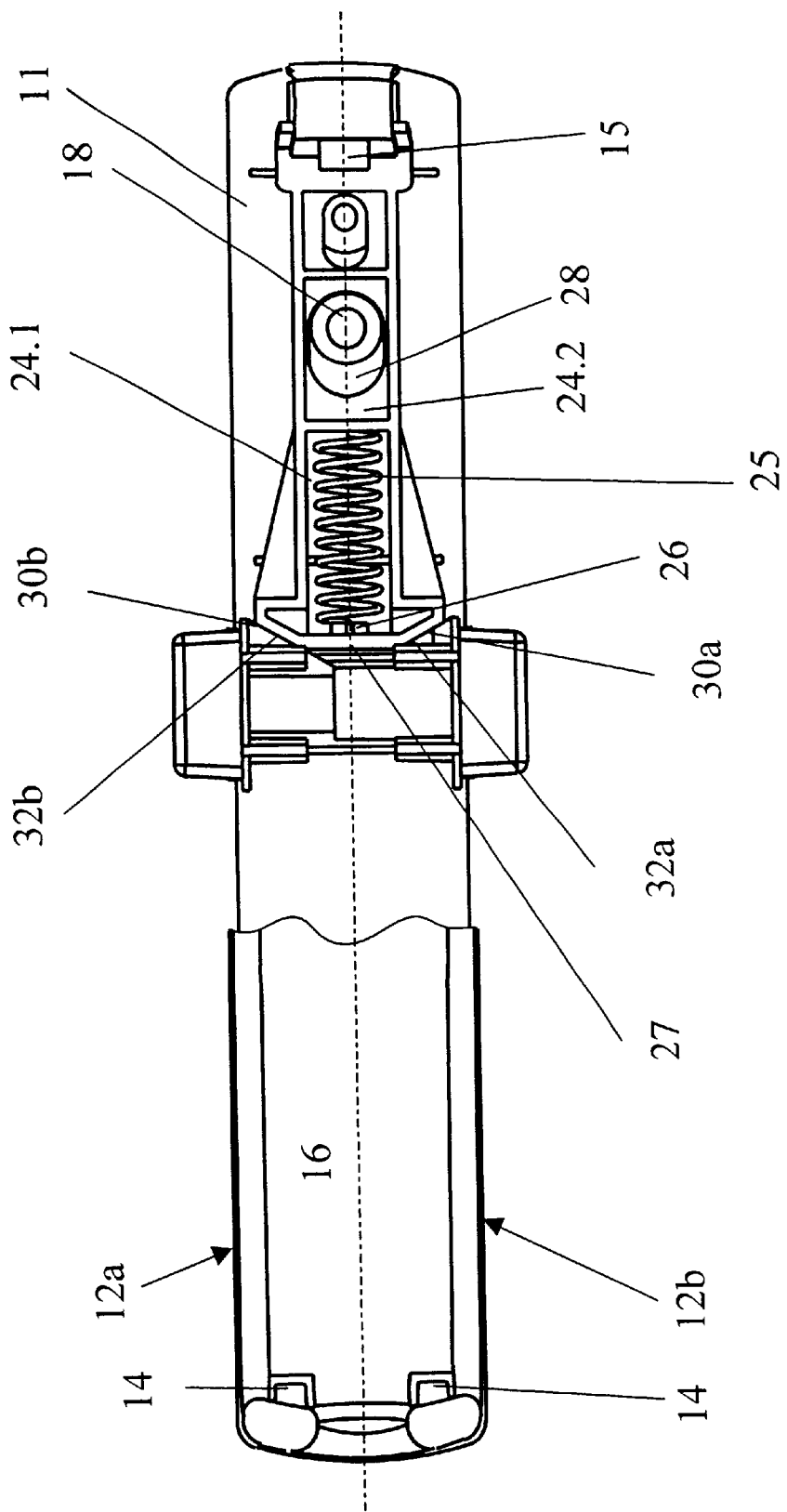
FIG. 4 A top view according to FIG. 3.
Figure 5:
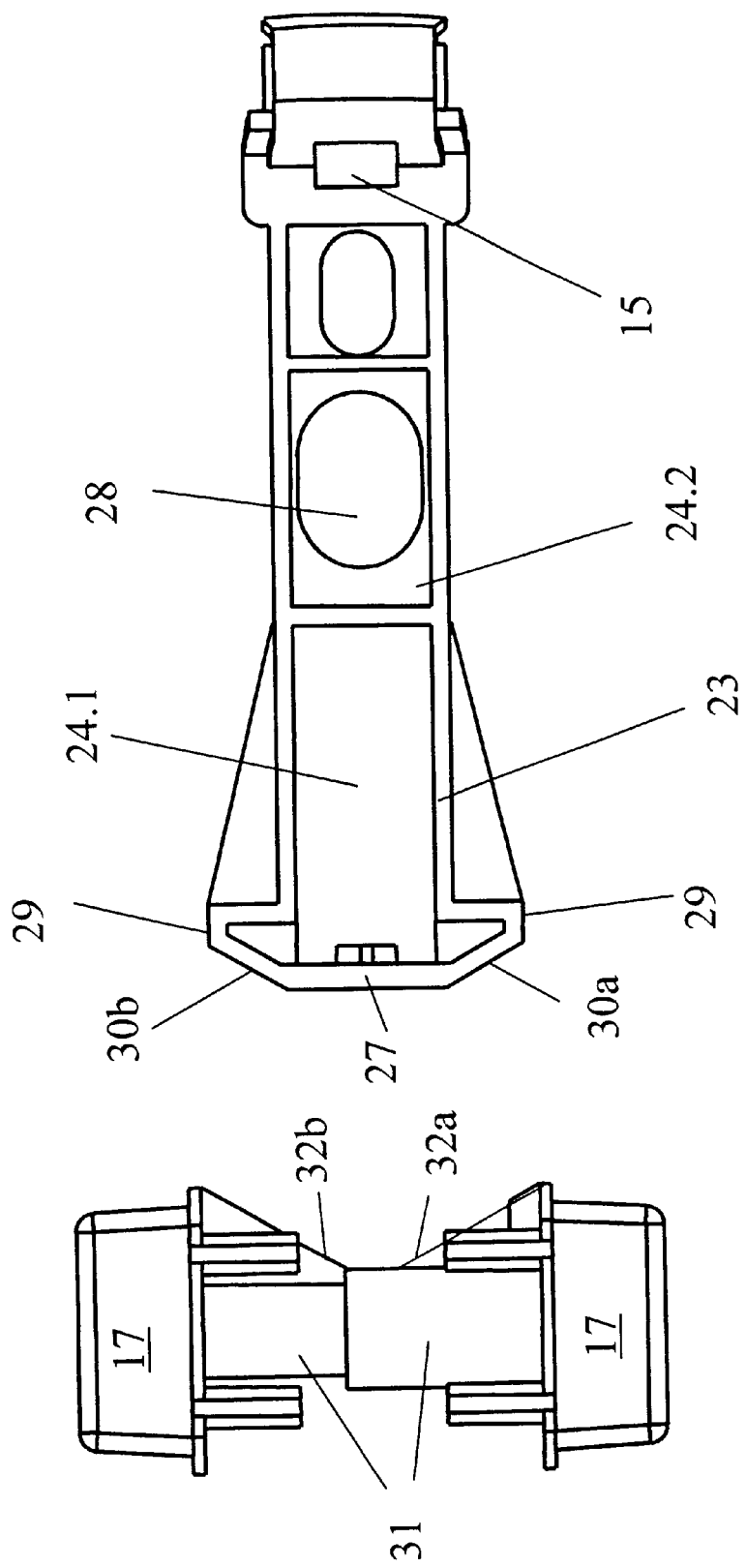
FIG. 5 Top view of a slider according to FIG. 4.

As can clearly be seen in the diagram according to FIG. 5, there are two secondary slide surfaces 30a, 30b on one end 27 (the lower end) of the slider 23. These second slide surfaces 30a, 30b are flat surfaces in this example. The buttons 17 used to activate the slider 23 are shown in an enlargement in FIG. 6. It is clearly illustrated in this diagram that each of the two buttons 17 has a guide sleeve 31, whereby one guide sleeve 31 is pressed into the guide sleeve 31 of the other button 17 when the two buttons 17 are pressed together. There are also guide elements designed into the base plate 11 to guide the two buttons 17, but they are not presented in more detail in the figures for the sake of clarity. It can also be seen in the diagram according to FIG. 6 that the two buttons 17 are equipped with first slide surfaces 32a, 32b. These first slide surfaces 32a, 32b are straight, although these slide surfaces 32a, 32b are not parallel or perpendicular to the imaginary centerline (FIG. 4).

Figure 6:
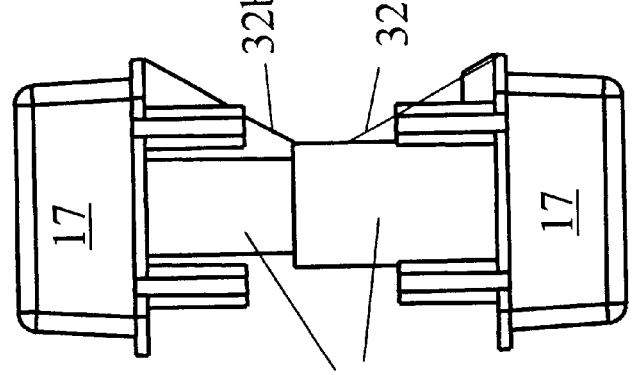
FIG. 6 Top view of the two buttons according to FIG. 4.
Figure 7:
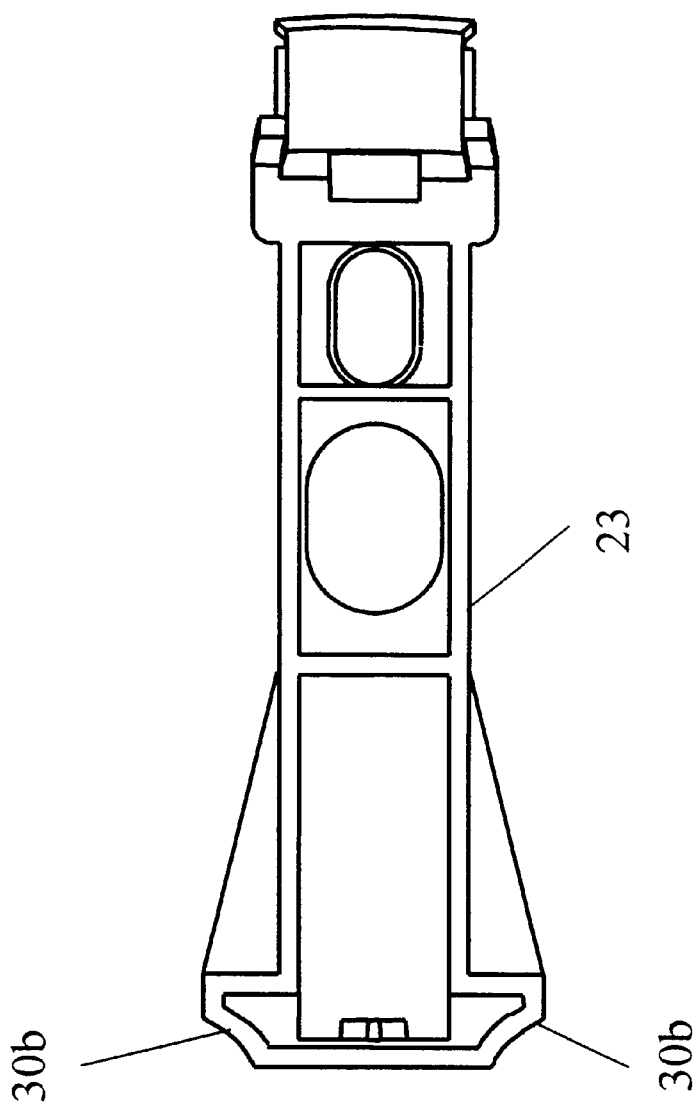
FIG. 7 Yet another drawing according to FIG. 5.
Figure 8:
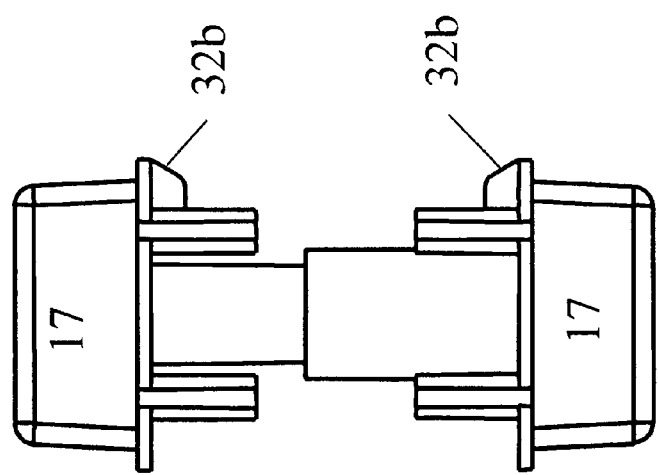
FIG. 8 Yet another drawing according to FIG. 6.

If a comfortable feeling is to be produced when the mobile telephone 15 clicks into position in the cradle 10, then the slide surfaces 30a, 30b and/or the slide surfaces 32a, 32b can also be designed as curved surfaces. FIGS. 7 and 8, which are almost identical to FIGS. 5 and 6, show a slider 23 and buttons, each with curved slide surfaces 30a, 30b, 32a, 32b.

If the friction between the slide surfaces 30 of the slider 23 and the slide surfaces 32 of the buttons 17 is to be reduced, the slide surfaces 32a, 32b on the buttons 17 could be modified in a different example (not shown) so that they only come into contact with the curved slide surfaces 30a, 30b of the slider 23 at a single point when viewed from an angle perpendicular to the plane of the paper in a diagram according to FIG. 4.

For the sake of completeness, we would like to point out that the slide surfaces 30a, 30b and/or 32a, 32b can be manufactured from a material with a low coefficient of friction in order to reduce the amount of friction. Good results have been obtained using Teflon 5coated slide surfaces 30, 32, for example.

If the slider 23 and the buttons 17 are assembled as shown in FIGS. 3 and 4, the first slide surfaces 32a, 32b are in physical contact with the second slide surfaces 30a, 30b. As can easily be seen, the positions of the slide surfaces 30, 32 with respect to the centerline cause the distance between the two first slide surfaces 32a, 32b to be reduced when pressure is applied to the buttons 17, thereby moving the slider 23 in direction of the arrow P2 at the same time due to the contact with the second slide surfaces 30a, 30b.

Because the other end 33 of the slider 23 is connected to the movable hook 15, the movable hook 15 will also be moved in direction of the arrow P2 at the same time as the slider 23 is in motion, which then, as explained above, causes the movable hook 15 to release the mobile telephone 19.1.

Finally, we would like to point out that in spite of the diagram in FIG. 6, which shows a slider 23 and a movable hook 15, the slider 23 and the movable hook 15 could be assembled using various components. It is only important in this case that a movement of the slider 23 in direction of the arrow P2 also moves the movable hook 15 in direction of the arrow P2. Just as in the case where the slider 23 and the movable hook 15 are one unit, it does not matter in this case either if the movable hook 15 is just bent back in direction of the arrow P2 by the movement of the slider 23 or is pushed out of the pocket (not shown) on the mobile telephone 19.1 with a sliding motion to reduce wear on the material.

What is claimed is:

1. A cradle comprising:

a body having two side surfaces and two face surfaces;

at least one tab;

at least one movable hook, wherein the at least one tab and movable hook are located on different surfaces of the same name and in which the at least one tab and movable hook secure a removable device in the cradle, wherein on at least one of the surfaces, which has a different name than the surfaces on which the at least one tab and movable hook are located, there is provided a button, on one end of which is located a first slide surface; and a slider, on one end of which there is at least one second slide surface, and the other end of which is engaged by the movable hook, wherein the first and second slide surfaces are in physical contact with each other.

2. A cradle according to claim 1, wherein the first and second slide surfaces are designed as either flat or curved surfaces.

3. A cradle according to claim 1 further comprising:

a plurality of springs that press the second slide surfaces against the first slide surfaces and/or that press the first slide surfaces against the second slide surfaces.

4. A cradle according to claim 1, further comprising:

a spring-loaded cap that presses against the device placed in the.

5. A cradle according to claim 1, wherein the device is a telephone.

* * * * *